(12) United States Patent
Völcker et al.

(10) Patent No.: US 12,149,634 B2
(45) Date of Patent: Nov. 19, 2024

(54) METHODS AND DEVICES FOR COMPRESSING SIGNED MEDIA DATA

(71) Applicant: Axis AB, Lund (SE)

(72) Inventors: Björn Völcker, Lund (SE); Stefan Lundberg, Lund (SE)

(73) Assignee: AXIS AB, Lund (SE)

( * ) Notice: Subject to any disclaimer, the term of this patent is extended or adjusted under 35 U.S.C. 154(b) by 219 days.

(21) Appl. No.: 18/084,905

(22) Filed: Dec. 20, 2022

(65) Prior Publication Data

US 2023/0208614 A1    Jun. 29, 2023

(30) Foreign Application Priority Data

Dec. 28, 2021    (EP) ..................................... 21217983

(51) Int. Cl.
*H04L 9/32* (2006.01)
*H04L 9/06* (2006.01)

(52) U.S. Cl.
CPC .......... *H04L 9/3247* (2013.01); *H04L 9/0643* (2013.01)

(58) Field of Classification Search
CPC .................................................... H04L 9/3247
See application file for complete search history.

(56) References Cited

U.S. PATENT DOCUMENTS

| | | | | |
|---|---|---|---|---|
| 6,381,367 | B1* | 4/2002 | Ryan ..................... | G06T 1/0057 382/116 |
| 2011/0080958 | A1* | 4/2011 | Srljan .................. | H04N 19/94 707/E17.014 |
| 2012/0166448 | A1 | 6/2012 | Li et al. | |
| 2014/0010366 | A1 | 1/2014 | Quinn et al. | |
| 2014/0164776 | A1* | 6/2014 | Hook .................. | G06F 21/6218 713/171 |
| 2016/0197939 | A1 | 7/2016 | Wang et al. | |
| 2018/0146071 | A1* | 5/2018 | Himayat ............. | G06F 16/9574 |
| 2021/0263662 | A1 | 8/2021 | Sadri et al. | |

FOREIGN PATENT DOCUMENTS

| | | |
|---|---|---|
| CN | 102413313 A | 4/2012 |
| CN | 110427781 A | 11/2019 |

OTHER PUBLICATIONS

Extended European Search Report dated Jul. 1, 2022 for European Patent Application No. 21217983.2.

\* cited by examiner

*Primary Examiner* — Bradley W Holder
(74) *Attorney, Agent, or Firm* — Volpe Koenig

(57) ABSTRACT

A signed media bitstream comprises data units and signature units. Each signature unit is associated with one or more nearby data units and include at least one fingerprint derived from the associated data units and a digital signature of the at least one fingerprint. A storing method comprises: receiving a segment of the media bitstream; identifying $N \geq 2$ instances of a repeating data unit in the received segment; pruning up to $N-1$ of the identified instances of the repeating data unit; and storing the received segment after pruning. A validation method comprises: receiving a segment of the media bitstream stored in accordance with the storing method; and validating a signature unit using a digital signature contained therein. Despite the pruning of the repeating data unit, the received associated data units can be successfully validated, either directly or indirectly, by means of different embodiments herein.

2 Claims, 7 Drawing Sheets

METHODS AND DEVICES FOR COMPRESSING SIGNED MEDIA DATA

FIELD OF INVENTION

The present disclosure relates to the field of security arrangements for protecting data against unauthorized activity. It proposes methods and devices for storing and validating signed media data, and video data in particular, with a reduced usage of storage space and/or transmission capacity.

TECHNICAL BACKGROUND

An audio bitstream, video bitstream or other media bitstream may be associated with various types of metadata. The metadata may include documentation indicating the time, place, content type and other conditions of its acquisition, it may contain settings that assist the playback of the media bitstream, information about the media coding format that has been used, or other indications of potential interest to a recipient of the media bitstream. It is a common practice to make the metadata available to the recipient by periodically inserting data units with the metadata into the media bitstream. Because of the open-ended nature of media bitstreams, it is difficult to predict whether the recipient will consume a short or long segment of the bitstream (e.g., play, send or save a copy of the segment), and where the segment will be located timewise in the bitstream. This leads the producer of the media bitstream to insert the data units with metadata at relatively short intervals, even though the metadata that they contain does not change in the meantime. The inserted data units represent overhead that consumes storage and communication resources unnecessarily.

In addition to metadata, a similar concern arises for any type of repeating data unit which the bitstream recipient needs to access just once, so-called only-needed-once information.

SUMMARY

The present disclosure makes available methods and devices for reducing the overhead in a signed media bitstream, which contains repeating data units in addition to generic data units and signature units. This may include, in particular, reducing the overhead in a definite segment of the media bitstream. It may further include carrying out the overhead reduction without any significant detriment to the data security of the originally signed media bitstream. Further, the present disclosure enables overhead reduction without re-signing the media bitstream, that is, without any need to obtain access to the cryptographic facilities by which the media bitstream was originally signed. Still further to the disclosure makes methods and devices available for validating a media bitstream which has undergone overhead reduction in the proposed way.

At least some of this achieved by the disclosure as defined in the independent claims.

In a first aspect of the disclosure, there is provided a method of storing a signed media bitstream composed of data units I, O, P and signature units $S_k$, which signature units are associated with one or more nearby data units. As used in this disclosure, "storing" could relate to permanent, long-term and short-term storage, and even ephemeral storage, such as the preparation of a digital datafile suitable for being transmitted over a communication network. The signature units enable a recipient of the media bitstream to validate the media bitstream, that is, to verify with reasonable confidence that the signature units are unaltered and to verify that the data units are in agreement with the signature units. For this purpose, each signature unit may include at least one fingerprint derived from the associated data units and a digital signature of the at least one fingerprint. The agreement of data units to signature units may include that an independent fingerprint calculation at the recipient side will produce fingerprints identical to the fingerprints in the signature units. The method according to the first aspect comprises: receiving a segment of the media bitstream; identifying $N \geq 2$ instances of a repeating data unit O in the received segment; pruning up to $N-1$ of the identified instances of the repeating data unit; and storing the received segment after pruning.

Because some of the repeating data units are removed, the size of the stored segment of the media bitstream will be smaller than the size of the received segment, which conserves memory and communication resources. Further, because at least one repeating unit remains in the stored segment, the recipient's access to the metadata is ensured. Furthermore, procedures can be designed by which recipients can validate the stored segment of the media bitstream at a comparable security level as they could validate the received segment. This allows the stored segment to be deposited in a non-secure memory or shared over a non-secure communication channel without introducing new uncertainty about its authenticity or integrity, as long as validation is successful at the recipient side.

In a second aspect of the disclosure, there is provided a method of validating a segment of a signed media bitstream composed of data units I, O, P and signature units $S_k$, which signature units are associated with one or more nearby data units. Each signature unit contains, as a minimum, at least one fingerprint derived from the associated data units and a digital signature of the at least one fingerprint. The method includes receiving a stored segment of the media bitstream; and validating a signature unit using any of the digital signature(s) contained therein. The received associated data units are then validated either directly or indirectly, which can be taken as a confirmation of the authenticity and/or integrity of the stored segment.

In one embodiment, at least one of the signature units includes: fingerprints of all associated data units, a digital signature of said fingerprints, and a minor digital signature, which is independent of the fingerprints of prunable ones of the associated data units. In this embodiment, the method comprises: receiving a stored segment of the media bitstream; validating a signature unit using the minor digital signature; and validating the received associated data units with respect to the fingerprints in the validated signature unit.

In another embodiment, at least one of the signature units includes: a fingerprint of fingerprints of all associated data units, a minor fingerprint of fingerprints, which is independent of the fingerprints of prunable ones of the associated data units (it is recalled that the signature unit has normally been prepared on the basis of the original media bitstream, before any instances of the repeating data unit have been pruned), and a digital signature of the fingerprint of fingerprints and of the minor fingerprint of fingerprints. The validation method comprises: receiving a stored segment of the media bitstream; validating a signature unit using the digital signature; computing fingerprints of the received associated data units; computing a fingerprint of the computed fingerprints units; and validating the computed fingerprint of fingerprints with respect to the minor fingerprint of fingerprints.

In another embodiment, at least one of the signature units includes: at least one fingerprint of the associated data units, and a digital signature of the at least one fingerprint. The method then comprises: receiving a stored segment of the media bitstream; receiving a pruning log for the stored segment, the pruning log indicating the positions in the bitstream of pruned instances of a repeating data unit O; validating a signature unit using the digital signature; and validating the received associated data units with respect to the signature unit, while ignoring fingerprints of absent data units indicated by the pruning log.

A further development of this embodiment, to be described below, addresses the case where said at least one fingerprint in the signature unit is a fingerprint of fingerprints of all associated data units.

In another embodiment, at least two of the signature units include: fingerprints of all associated data units, and a digital signature of the at least one fingerprint. The method then suitably comprises: receiving a stored segment of the media bitstream; validating the signature units using the respective digital signatures; locating an instance of a repeating data unit O associated with a first one of the signature units; and validating the received data units associated with a second one of the signature units with respect to the fingerprints therein, while any fingerprint coinciding with the fingerprint of the located instance of the repeating data unit is ignored. Optionally, this embodiment also includes a step of validating the received data units associated with the first one of the signature units with respect to the fingerprints therein.

In yet another embodiment, at least one of the signature units includes: a fingerprint of fingerprints of all associated data units, and a digital signature of the fingerprint of fingerprints and of the minor fingerprint of fingerprints. Further, the media bitstream is in accordance with a format where positions of a repeating data unit O are fixed (i.e., in the sense of being reproducible at the recipient side). To address this use case, the method comprises: receiving a stored segment of the media bitstream; validating a signature unit using the digital signature; computing fingerprints of the received associated data units; computing a fingerprint of an instance, not associated with the signature unit, of the repeating data unit and reinstating this in accordance with said fixed positions; computing a fingerprint of the computed fingerprints; and validating the computed fingerprint of fingerprints with respect to the fingerprint of fingerprints in the signature unit.

Any of these outlined embodiments ensures, for a respective configuration of the media bitstream format, that the stored segment of the media bitstream can be validated at a recipient side. Accordingly, the pruning of the repeating data units O achieves an overhead reduction that does not undo the usefulness of the signing. The signing-validation chain remains intact.

In a third aspect of the disclosure, there is provided a method of generating a signed media bitstream for which data compression is enabled in connection with the storing of a segment of the media bitstream. The method generates a bitstream composed of data units I, O, P and signature units $S_k$ associated with one or more nearby data units, and each signature unit includes at least one fingerprint derived from the associated data units and a digital signature of the at least one fingerprint. According to the third aspect, at least one of the signature units includes:

(a) fingerprints of all associated data units and a minor signature, which is independent of the fingerprints of prunable ones of the associated data units, and/or (b) a fingerprint of fingerprints of all associated data units and a minor fingerprint of fingerprints, which is independent of the fingerprints of the prunable associated data units.

The method supports the performance of the methods according to the first and second aspects. It can be implemented, for example, in a video acquisition system.

The disclosure further relates to devices configured to carry out the above methods, as well as a computer program containing instructions for causing a computer to carry out these methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 1:
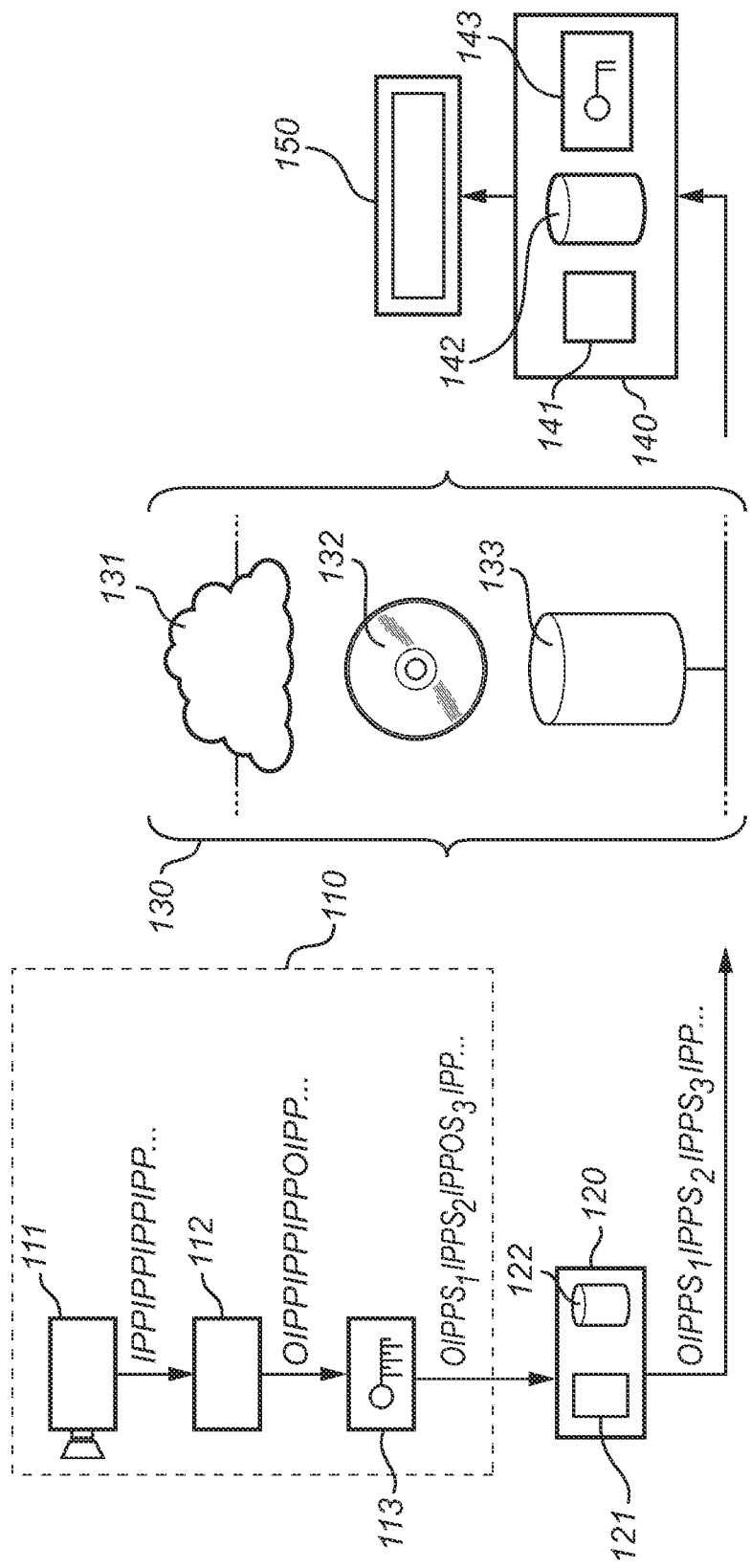
FIG. 1 shows connected entities which exchange segments of a signed media bitstream.

The methods and devices for storing and validating segments of a media bitstream can be of value in a variety of different contexts and for many types of media data. FIG. 1 shows connected entities which exchange (e.g., store/retrieve, send/receive) segments of a signed media bitstream. FIG. 1 illustrates one presently contemplated embodiment, in which a video acquisition system 110 generates a signed video bitstream, which a first device 120 stores in order to render it suitable for a channel 130, thereby allowing a recipient to obtain it. The channel 130 may be constituted by a communication network 131, a portable memory 132 and/or a memory 133. It is recalled that the act of "storing" the bitstream segment can, in some embodiments, relate to ephemeral storage, such as the preparation of a digital datafile suitable for being transmitted over the communication network 131, in addition to conventional long- or short-term storage in memories 132, 133. The recipient has at its disposal a second device 140 configured to retrieve and validate the stored segment of the video bitstream from the channel 130, and optionally uses a playback device 150 to render the video sequence. It is noted, especially in the use case of storage in memories 132, 133, that the entity performing the storing of the video bitstream may coincide with the recipient. In this case, say, when the first device 120 and second device 140 coincide, the validation of the video bitstream segment serves to verify that the segment has not been altered after it was deposited in one of the memories 132, 133.

The video acquisition system 110 more precisely includes a camera 111, a metadata insertion stage 112 and a cryptographic element 113. The camera 111 is configured to acquire a video sequence, which it outputs represented as a video bitstream including video data units. At least some of the video data units may correspond to respective frames of the video sequence. The correspondence may entail that all data which is specific to one frame is contained in the respective video data unit. The video bitstream may further include non-frame data units, such as messages, signature units or other data structures.

The camera 111 may be configured to apply various types of data compression, such as lossless or lossy compression, which is optionally combined with prediction coding. Before reviewing elements of prediction coding in the next paragraph, it is emphasized that the present disclosure is applicable to generic media bitstreams, including video bitstreams to which no prediction coding is being applied.

The ability to predict one video frame given past frames depicting a common scene is an underlying assumption of prediction coding. Prediction coding may be described as a data compression technique specifically adapted for video data. A segment of a prediction-coded video sequence may be composed of I-frames and P-frames. The I-frame and P-frame are not to be confused with the plaintext video frames that these data structures encode. An I-frame is a data structure with independently decodable video data, which can be decoded into a plaintext video frame (or a block of a video frame) by means of a predefined associated decoding operation. A P-frame, for its part, is a data structure whose associated decoding operation makes reference not only to the video data of the P-frame itself but also to at least one other I- or P-frame. Conceptually, and somewhat simplified, the video data in a P-frame expresses the change or movement relative to the video frame that its preceding I- or P-frame encodes. Normally, if the decoding operations are successful, video frames decoded from P-frames and I-frames cannot be distinguished. An example fragment of the video bitstream may have the following appearance: IPPIPPPPIPPPIPPP. Here, each P-frame refers to the immediately preceding I- or P-frame. If a leading P-frame refers to a preceding P-frame, the preceding P-frame necessarily refers to at least one further I- or P-frame. The combination of an I-frame and the subsequent P-frames which refer to the I-frame directly or indirectly can be referred to as a group of pictures (GOP). In the example, the following GOPs can be discerned: IPP, IPPPP, IPPP, IPPP.

Two further developments of prediction coding may be illustrated by a second example frame sequence: IBBPB-BIBBPBBI. Here, the B-frames refer (bidirectionally) to their nearest I- or P-frame neighbors, and each P-frame refers (unidirectionally) to the nearest preceding I-frame. Accordingly, in addition to the forward-predicted P-frame structure, a bidirectionally predicted B-frame can be used in prediction coding. The underlying bidirectional prediction operation may include interpolation between the referenced frames, such as smoothing. The second example IBBPB-BIBBPBBI furthermore shows that a P-frame can refer to a I-, P- or B-frame that need not be immediately preceding but can be located two or more steps away. The fragment of the second example, IBBPBBIBBPBBI, may be characterized as a GOP since it can be decoded without reference to any other I-, P- or B-frames. Recommendation ITU-T H.264 (June 2019) "Advanced video coding for generic audiovisual services", International Telecommunication Union, specifies a video coding standard in which both forward-predicted and bidirectionally predicted frames are used.

Even though identical notation I, P is used in the present disclosure for all I- and P-frames, it is understood that these frames are not identical copies. Rather, they contain mutually independent video data which may or may not coincide across frames.

The metadata insertion stage 112 is configured to insert data units O which contain metadata applicable to the entirety of the video bitstream. As already noted, this metadata may include documentation indicating the time, place and other conditions of (the start or end of) the acquisition of the video bitstream, it may contain settings that enable optimal playback, information about the video coding format that has been used, a certificate or a (public) cryptographic key to be used for validation, or other indications of potential use to a recipient of the video bitstream. As long as none of these indications change, the metadata is unchanged too, and the data units O may thus be qualified as repeating. Accordingly, a recipient of the video bitstream may choose to obtain the metadata from any one data unit O of the recipient's choice. In a functioning system, there is generally no additional benefit to be expected from reading a further data unit O in the video bitstream.

The cryptographic element 113 is configured to insert signature units $S_1$, $S_2$, $S_3$ into the video bitstream. In all embodiments to be described, each signature unit includes at least one fingerprint derived from associated data units located before, after or around the signature unit, as well as a digital signature of the at least one fingerprint. The collection of fingerprints may be referred to as a document. To generate the digital signature, the cryptographic element 113 may have stored therein a private key. The recipient may hold a public key belonging to the same key pair, which enables the recipient to verify that the signature produced by the cryptographic element 113 is authentic but not to generate new signatures. In the illustrated example, the public key is held in the cryptographic element 143. The public key could also be included as metadata of the media bitstream, in which case it is not necessary to store it at the recipient side. In the ITU-T H.264 format, the signature unit may be included as a Supplemental Enhancement Information (SEI) message in the video bitstream. In the AV1 standard, the signature may be included in a Metadata Open Bitstream Unit (OBU).

Each one of the signature units $S_1$, $S_2$, $S_3$ may either include fingerprints of all associated data units, or it may include a fingerprint of the fingerprints of all associated data units. Each of the fingerprints may be a hash or a salted hash. A salted hash may be a hash of a combination of the data unit (or a portion of the data unit) and a cryptographic salt; the presence of the salt may stop an unauthorized party who has access to multiple hashes from guessing what hash function is being used. Potentially useful cryptographic salts include a value of an active internal counter, a random number, and a time and place of signing. The hashes may be generated by a hash function (or one-way function) h, which is a cryptographic function that provides a safety level considered adequate in view of the sensitivity of the video data to be signed and/or in view of the value that would be at stake if the video data was manipulated by an unauthorized party. Three examples are SHA-256, SHA3-512 and RSA-1024. The hash function shall be predefined (e.g., it shall be reproducible) so that the fingerprints can be regenerated when the recipient is going to verify the fingerprints.

Figure 2:
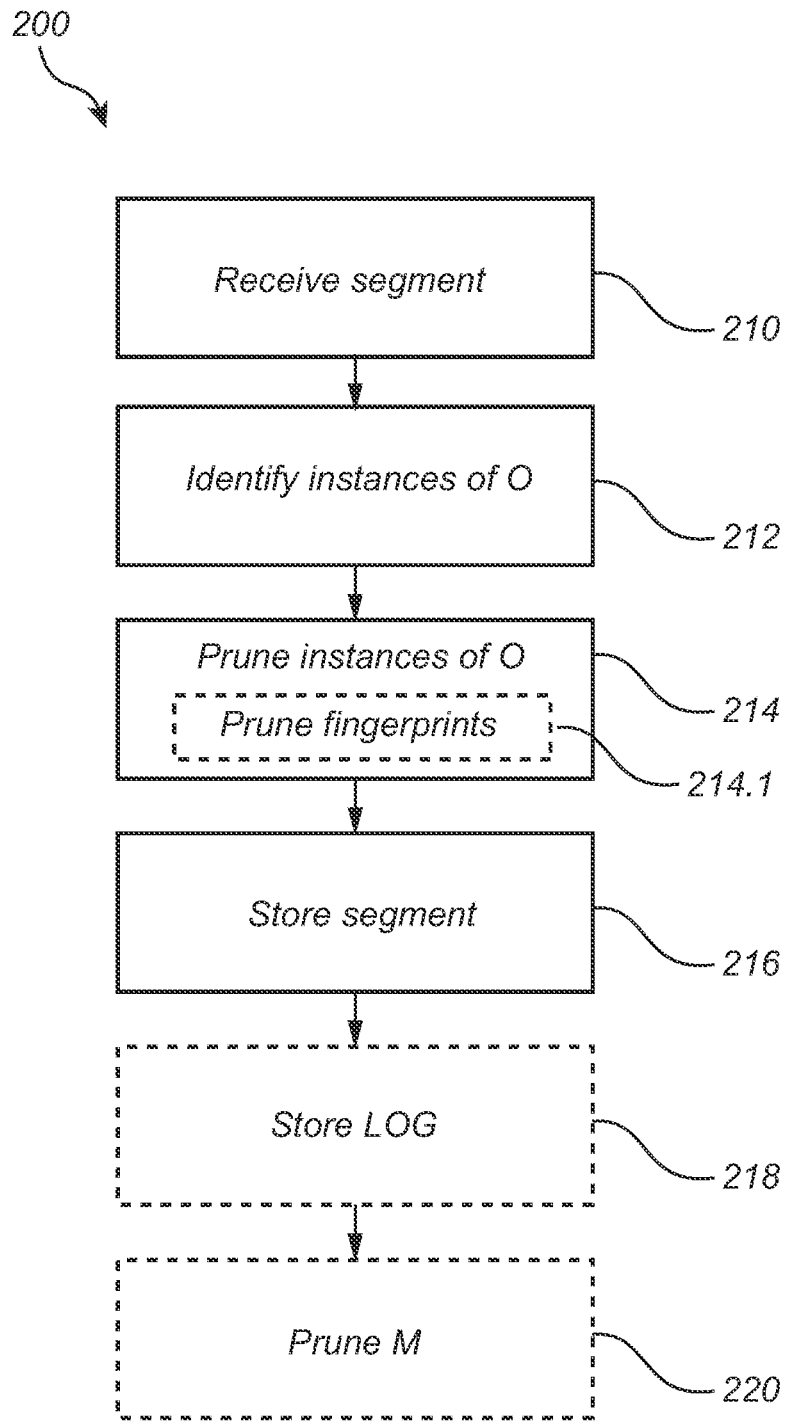
FIG. 2 is a flowchart of a method of storing a signed media bitstream.

The first device 120, in which the storing of video bitstream segments is performed in accordance with the storing method 200 of FIG. 2, may be any suitable local or distributed processing resource, functionally composed of processing circuitry 121 and a memory 122. The first device may be a component of a so-called video management system, or VMS. In various embodiments, the first device 120 is configured to process live video bitstreams or offline video bitstreams, or both.

The second device 140 may be implemented as any suitable form of local or distributed processing resource, functionally composed of processing circuitry 141, a memory 142 and an optional cryptographic element 143 in which a public key is deposited. The second device 140 is configured to carry out the validation method 300 of FIG. 3, according to any of the embodiments to be described next.

Figure 3:
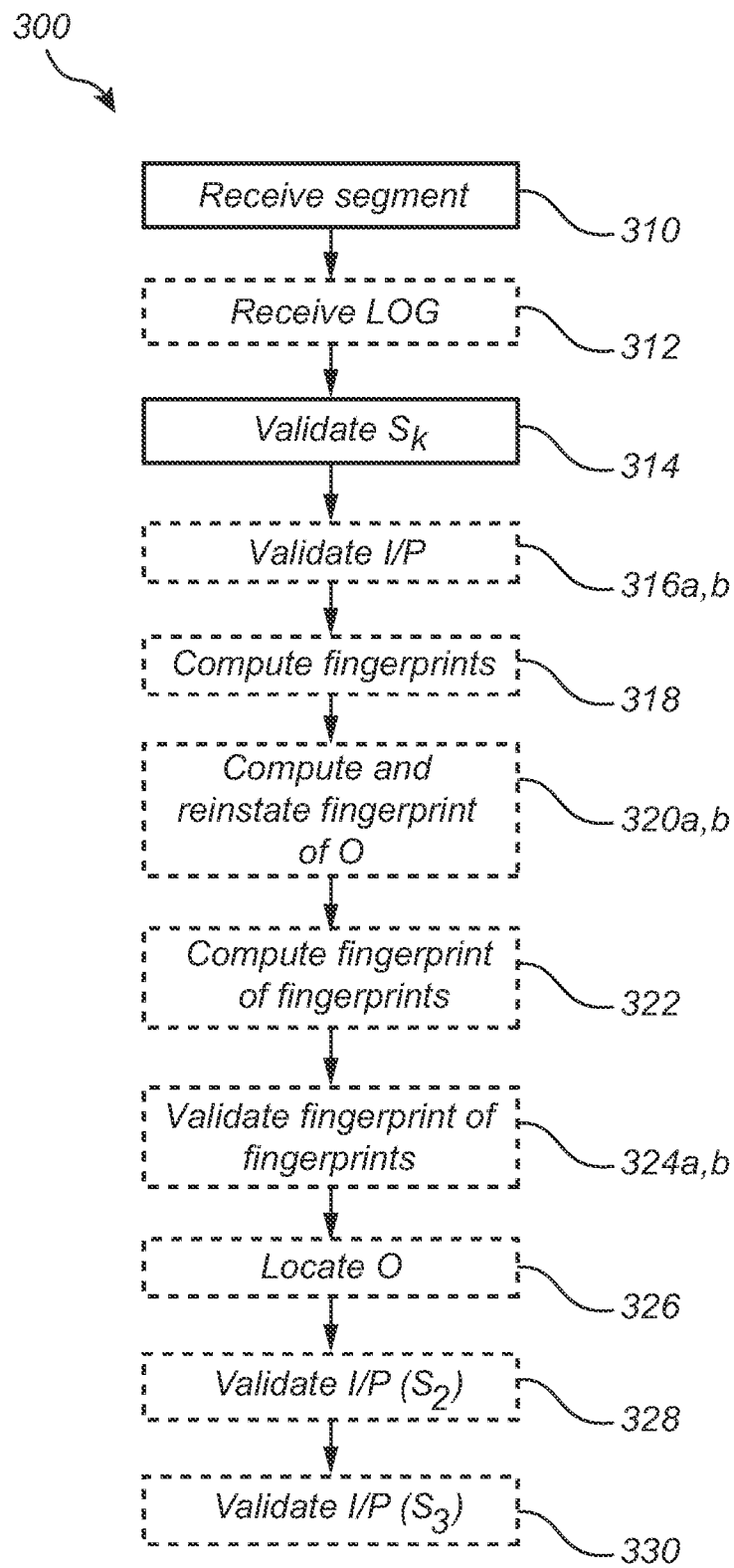
FIG. 3 is a flowchart of a method of validating a segment of a signed media bitstream.

By way of overview, Table 1 indicates the applicability of the embodiments of the storing method 200 and validation method 300 respectively depicted in FIGS. 2 and 3.

TABLE 1

| Embodiments | | |
|---|---|---|
| Media bitstream format has fixed O positions | Individual fingerprints (hashes) | 1A.1 |
|  |  | 1A.2 |
|  | Fingerprints of fingerprints (hash of hashes) | 1B |
| Media bitstream format has variable O positions | Individual fingerprints (hashes) | 2A.1 |
|  |  | 2A.2 |
|  | Fingerprints of fingerprints (hash of hashes) | 2B.1 |
|  |  | 2B.2 |

In FIGS. 2 and 3, dashed boxes represent steps that are optional or occur only in certain embodiments. It is emphasized that the order of the steps shown in FIGS. 2 and 3 is not necessarily significant. Rather, as those skilled in the art will realize, the order of certain steps can be modified and/or certain steps can be executed in parallel.

Embodiment 1A.1

Figure 4:
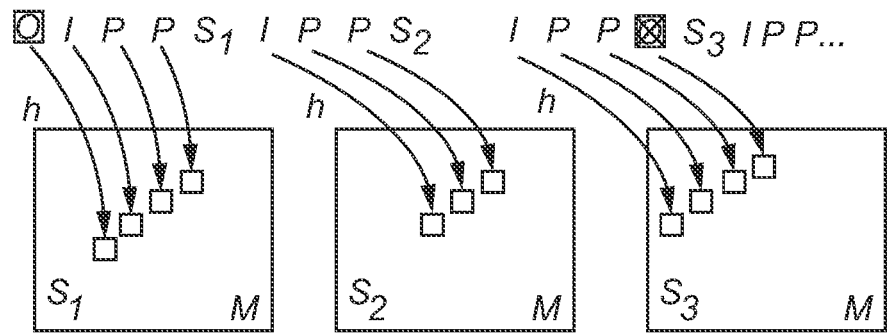
FIG. 4 illustrates a sequence of video frames including signature units $S_1$, $S_2$, $S_3$, the respective contents of which are shown in the lower part of the Figure, and repeating frames O at fixed positions, to which is an Embodiment 1A.1 of the disclosure is applicable for storing and validation.

With reference to FIG. 4, a media bitstream format is considered which contains data units I, P and where the repeating data unit O occupies fixed positions, indicated by rectangles. Because the bitstream format specifies such fixed positions, the second device 140 will be able to figure out between which data units in the stored bitstream segment the first device 120 has pruned instances of the repeating data unit O, if any. It is noted that the data units I, P in FIG. 4 precede the associated signature units $S_1$, $S_2$, $S_3$; in other embodiments, however, the data units I, P could succeed the signature units $S_1$, $S_2$, $S_3$, or they could be located both before and after. It is seen in FIG. 4 that the signature units $S_1$, $S_2$, $S_3$ each contain a document of individual fingerprints (hashes) of the associated data units and further contain a signature M. The signature unit can be validated at the recipient side using the signature M. Assuming the media bitstream is a video bitstream, the I and P data units may represent I- and P-frames and there is one signature unit per GOP.

Embodiment 1A.1 of the storing method 200 includes receiving 210 a segment of the media bitstream; identifying 212 N≥2 instances of a repeating data unit O in the received segment; pruning 214 up to N−1 of the identified instances of the repeating data unit; and storing 216 the received segment after pruning. It is understood that the signature units $S_1$, $S_2$, $S_3$ are stored intact, i.e., in the same condition as they were received 210.

The step of receiving 210 the segment may include having the segment delivered in a message sent over a local or external communication network, wherein the communication may have been self-requested by initiated by a different entity than the one performing the method 200. "Receiving" in the sense of step 210 could also include retrieving the segment from a memory.

The step of pruning 214 a number of the identified instances of the repeating data unit O could include deleting data units from the segment before it is stored. It could also include indirect various types of deletion requests, such as adding a marker (flag) to the instances indicating that they shall not be saved and/or not transmitted, or that they are free to be overwritten in memory once stored.

The step of storing 216 the received segment after pruning may include instantiating or editing a file, object, database item or another data structure. As already mentioned, it is not essential to the present disclosure to maintain the stored segment in a lasting fashion, e.g., in a non-volatile memory. Rather, the stored segment can be an ephemeral file to be used for imminent transmission or relaying, which can be discarded afterwards. Nor is it essential that a file representing the entirety of the segment exists at one point in time; rather, network transmission of the earlier parts of the segment can begin before the later parts of the segment are created. This allows the overhead-reducing method 200 to be integrated in a processing chain suitable for live streaming and similar applications.

It may be noted that the method 200 can be successfully performed by an entity that is not authorized to generate new digital signatures, i.e., without access to the private key. Accordingly, the method 200 can be implemented by the first device 120 in FIG. 1.

Embodiment 1A.1 of the validation method 300 includes receiving 310 a stored segment of the media bitstream; validating 314 the signature units using the respective digital signatures; locating 326 an instance of a repeating data unit O associated with a first one of the signature units; validating 328 the received data units associated with the first one of the signature units with respect to the fingerprints therein; and validating 330 the received data units associated with a second one of the signature units with respect to the fingerprints therein. In step 330, any fingerprint coinciding with the fingerprint of the located instance of the repeating data unit is ignored. This ignoring is neutral from the point of view of security, because the repeating data unit O has already been validated. The ignoring also allows the validation method 300 to proceed even though some instances of the repeating data unit O have been pruned, whereby the corresponding fingerprints cannot be paired with data units in the received segment of the media bitstream.

The step of receiving 310 the stored segment may include receiving the segment in a message transmitted over the communication network 131 and/or reading the segment from a memory 132, 133, etc.

The step of validating 314 the signature units $S_1$, $S_2$, $S_3$ may include using the public key of the key pair to verify that the fingerprints contained therein are authentic, in a per se known manner. This can be described as an asymmetric signature setup, where signing and verification are distinct cryptographic operations corresponding to private/public keys. Other combinations of symmetric and/or asymmetric verification operations are possible without departing from the scope of the disclosure.

The steps of validating 328 and 330 the received data unit I, P may include replicating a fingerprinting operation deemed to have been performed at the source of the media bitstream, i.e., recomputing the fingerprints using the same hash function h. If all fingerprints in a signature unit are successfully verified, it may be concluded that the corresponding data units of the segment are authentic (validation).

The details relating to steps such as "receiving", "pruning", "validating" etc. are also applicable to embodiments to be described in the later sections of this disclosure, unless otherwise stated, and will therefore not be repeated.

Embodiment 1A.2

Figure 5:
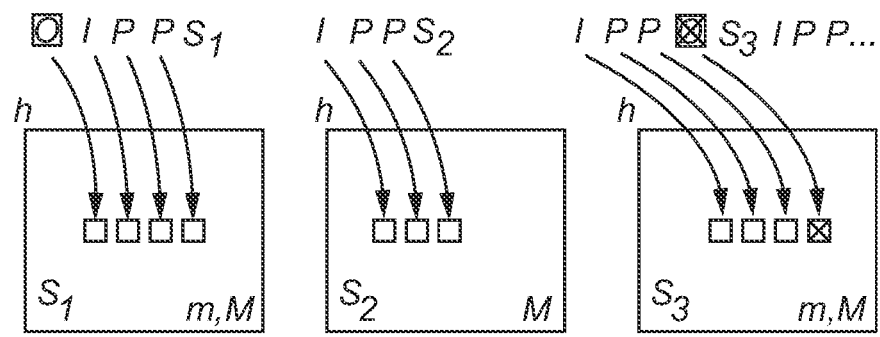
FIG. 5 illustrates a sequence of video frames including signature units $S_1$, $S_2$, $S_3$, the respective contents of which are shown in the lower part of the Figure, and repeating frames O at fixed positions, to which is an Embodiment 1A.2 of the disclosure is applicable for storing and validation.

With reference to FIG. 5, a media bitstream format is considered where the repeating data unit O occupies fixed positions, indicated by rectangles. If the first device 120 has pruned one instance of the repeating data units O, the second device 140 will be able to determine between which data units in the stored bitstream segment these instances were located. It is seen in FIG. 5 that the signature units $S_1$, $S_2$, $S_3$ contain individual hashes of the associated data units. The signature units $S_1$, $S_2$, $S_3$ further contain a signature (major signature) M and a minor signature m. The major signature M is used to validate the original signature unit, i.e., in its condition when leaving the video acquisition system 110. The minor signature m is independent of the fingerprints of any prunable instances of the repeating data unit O. An instance of the repeating data unit O is generally prunable unless it is the sole instance in a segment, in which case the recipient cannot replace it by reading the metadata from another instance. The second signature unit $S_2$ does not contain any fingerprint of a prunable instance of the repeating data unit, so there is no need to include a minor signature m, although this could optionally be done to enhance the uniformity of the bitstream format.

Ways to generate the minor and major signatures will be briefly discussed, using the first signature unit $S_1$ as an example. On the one hand, these signatures can be generated as follows:

$$M=s(\{h(O),h(I),h(P),h(P)\}),$$

$$m=s(\{h(I),h(P),h(P)\}),$$

where $\{\bullet\}$ denotes concatenation and s is a signing function dependent on the private key in the key pair. It is noted that the minor signature m is independent of h(O). Alternatively, the minor and major signatures are generated iteratively, and possibly in a multi-level fashion. In a first step, the minor signature is generated by signing the fingerprints of all data units but the prunable data units:

$$m=s(\{h(I),h(P),h(P)\}).$$

The minor signature m is independent of the fingerprints of any prunable instances of the repeating data unit O. In a second step, the major signature M is generated by signing a combination (e.g., concatenation) of the minor signature m and the prunable data units:

$$M=s(\{m,h(O)\}).$$

This formulation of the major signature M has a dependence on the fingerprints of all data units associated with the first signature unit $S_1$. Since cryptographic signing is a computationally complex operation, the alternative setup could enable a perceivable computational saving. It also establishes a link between the minor and major signatures which could render it more difficult for an unauthorized party to replace the minor signature m to fake a positive validation outcome.

Embodiment 1A.2 of the storing method 200 includes receiving 210 a segment of the media bitstream; identifying 212 N≥2 instances of a repeating data unit O in the received segment; pruning 214 up to N−1 of the identified instances of the repeating data unit; pruning 214.1 the fingerprints of the pruned up to N−1 instances of the repeating data unit; and storing 216 the received segment after pruning. Optionally, the major signature M in those signature units that are associated with at least one pruned repeating data unit can be pruned 220 to further reduce overhead.

Embodiment 1A.2 of the validation method 300 includes receiving 310 a stored segment of the media bitstream; validating 314 a signature unit using the minor digital signature m; and validating 316a the received associated data units with respect to the fingerprints in the validated signature unit. Those signature units which do not include a minor signature m are validated in the conventional manner, using the major signature M. The first signature unit $S_1$, which contains a minor and a major signature unit but is not associated with any pruned instance of the repeating data unit O, can be validated using the major digital signature M. The second device 140 can be configured to initially attempt to validate each signature unit using the minor signature m; if this fails or the minor signature m is absent, it attempts to validate the signature unit using the major signature M; if both attempts are unsuccessful, the signature unit is rejected. Alternatively, the second device 140 is configured to initially attempt to validate each signature unit using the major signature M; if this fails, it checks whether a minor signature m exists and, if so, attempts to validate the signature unit using the minor signature m; if both attempts are unsuccessful, the signature unit is rejected. The alternative way of configuring the second device 140 may be marginally more efficient if the signature units associated with pruned instances of the repeating data unit O constitute a relatively small fraction. It is noted that the knowledge of the fixed positions, at which the pruned instances of the repeating data unit O were located in the original media bitstream, is not utilized in this embodiment.

Embodiment 1B

Figure 6:
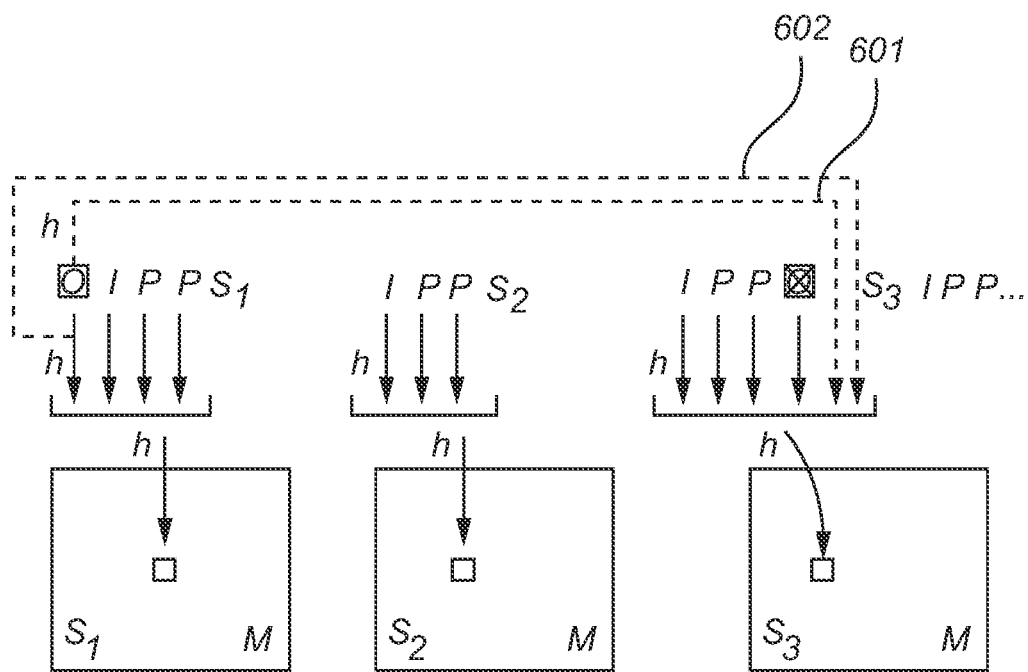
FIG. 6 illustrates a sequence of video frames including signature units $S_1$, $S_2$, $S_3$, the respective contents of which are shown in the lower part of the Figure, and repeating frames O at fixed positions, to which is an Embodiment 1B of the disclosure is applicable for storing and validation.

With reference to FIG. 6, a media bitstream format is considered where the repeating data unit O occupies fixed positions, indicated by rectangles. If the first device 120 has pruned one instance of the repeating data units O, the second device 140 will be able to determine the data units in the stored bitstream segment between which these instances were located. It is seen in FIG. 6 that the signature units $S_1$, $S_2$, $S_3$ contain fingerprints of fingerprints, i.e., obtained by applying the hash function h in a multi-level fashion. For example, the fingerprint in the first signature unit $S_1$ can be $h(\{h(O), h(I), h(P), h(P)\})$, where $\{\bullet\}$ denotes concatenation, such as bitwise juxtaposition. Alternatively, a cascading application of the hash function is possible: $h_1=h(O)$, $h_2=h(\{h_1, I\})$, $h_3=h(\{h_2, P\})$ (first P-frame), $h_4=h(\{h_3, P\})$ (second P-frame). From these, the fingerprint $h_4$, which has an at least indirect dependence on all associated data units O, I, P, P, is included in the first signature unit $S_1$. This is not illustrated in FIG. 6. For purposes of Embodiment 1B, it is sufficient for the signature units $S_1$, $S_2$, $S_3$ to contain only the major signature M.

Embodiment 1B of the storing method 200 includes receiving 210 a segment of the media bitstream; identifying 212 N≥2 instances of a repeating data unit O in the received segment; pruning 214 up to N−1 of the identified instances of the repeating data unit; and storing 216 the received segment after pruning. It is understood that the signature units $S_1$, $S_2$, $S_3$ are stored intact, i.e., in the same condition as they were received 210.

Embodiment 1B of the validation method 300 includes receiving 310 a stored segment of the media bitstream; validating 314 a signature unit using the digital signature; computing 318 fingerprints of the received associated data units; computing 320b a fingerprint of an instance, not associated with the signature unit, of the repeating data unit and reinstating this (as suggested by the lower dashed line 601) in accordance with said fixed positions; computing 322 a fingerprint of the computed fingerprints; and validating 324b the computed fingerprint of fingerprints with respect to the fingerprint of fingerprints in the signature unit. An equivalent alternative to computing 320b the fingerprint of said instance of the repeating data unit is to retrieve the fingerprint from its associated signature unit (upper dashed line 602). It is uncertain, however, whether the media bitstream format allows this particular fingerprint, which constitutes an intermediate result of the computation of the fingerprints of fingerprints, to be stored in the signature unit. If the fingerprint is retrieved along the upper dashed line 602, there is no need to apply the calculate-reinstate procedure illustrated by the lower dashed line 601.

Embodiment 2A.1

Figure 7:
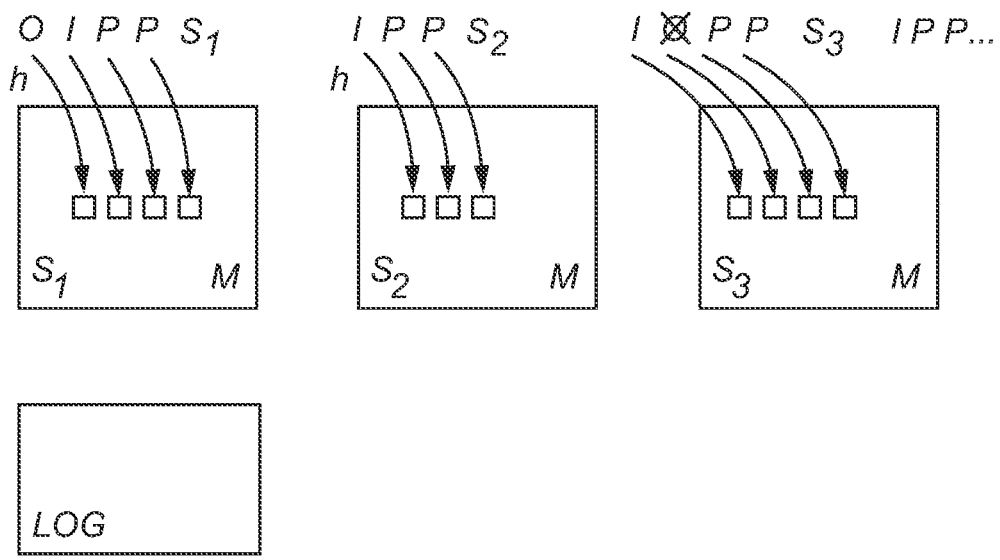
FIG. 7 illustrates a sequence of video frames including signature units $S_1$, $S_2$, $S_3$, the respective contents of which are shown in the lower part of the Figure, and repeating frames O at arbitrary positions, to which is an Embodiment 2A.1 of the disclosure is applicable, wherein a data structure LOG is added at storing and consulted at validation.

With reference to FIG. 7, a media bitstream format is considered where the repeating data unit O occupies variable positions. It is seen in FIG. 7 that the signature units $S_1$, $S_2$, $S_3$ contain individual hashes of the associated data units and further contain a signature M, using which the signature unit can be validated at the recipient side. The data structure LOG is not part of the media bitstream format.

Embodiment 2A.1 of the storing method 200 includes receiving 210 a segment of the media bitstream; identifying 212 N≥2 instances of a repeating data unit O in the received segment; pruning 214 up to N−1 of the identified instances of the repeating data unit; storing 216 the received segment after pruning; and storing 218 a pruning log LOG indicating the positions in the bitstream of the pruned instances of the repeating data unit O. It is understood that the signature units $S_1$, $S_2$, $S_3$ are stored intact, i.e., in the same condition as they were received 210. It is furthermore understood that the pruning log will occupy relatively less space than the pruned instances of the repeating data unit O, so that a net saving is attained.

Embodiment 2A.1 of the validation method 300 includes receiving 310 a stored segment of the media bitstream; receiving 312 a pruning log for the stored segment, the pruning log indicating the positions in the bitstream of pruned instances of a repeating data unit O; validating 314 a signature unit using the digital signature; and validating 316b the received associated data units with respect to the signature unit, while ignoring fingerprints of absent data units indicated by the pruning log, illustrated as LOG in FIG. 7.

Embodiment 2A.2

Figure 8:
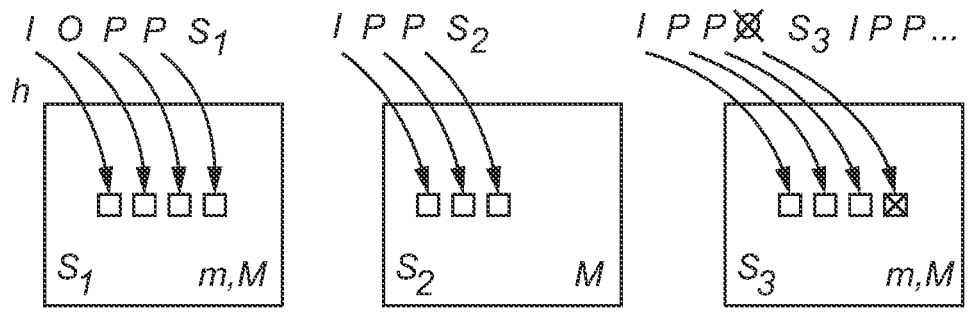
FIG. 8 illustrates a sequence of video frames including signature units $S_1$, $S_2$, $S_3$, the respective contents of which are shown in the lower part of the Figure, and repeating frames O at arbitrary positions, to which is an Embodiment 2A.2 of the disclosure is applicable for storing and validation.

With reference to FIG. 8, a media bitstream format is considered where the repeating data unit O occupies variable positions. It is seen in FIG. 8 that the signature units $S_1$, $S_2$, $S_3$ contain individual hashes of the associated data units. The signature units $S_1$, $S_2$, $S_3$ further contain a signature (major signature) M and a minor signature m. The major signature M is used to validate the original signature unit, i.e., in its condition when leaving the video acquisition system 110. The minor signature m is independent of the fingerprints of any prunable instances of the repeating data unit O. An instance of the repeating data unit O is generally prunable unless it is the sole instance in a segment, in which case the recipient cannot replace it by reading the metadata from another instance. The second signature unit $S_2$ does not contain any fingerprint of a prunable instance of the repeating data unit, so there is no need to include a minor signature m.

Embodiment 2A.2 of the storing method 200 includes receiving 210 a segment of the media bitstream; identifying 212 N≥2 instances of a repeating data unit O in the received segment; pruning 214 up to N−1 of the identified instances of the repeating data unit; pruning 214.1 the fingerprints of the pruned up to N−1 instances of the repeating data unit; and storing 216 the received segment after pruning. Optionally, the major signature M in those signature units that are associated with at least one pruned repeating data unit can be pruned 220 to further reduce overhead.

Embodiment 2A.2 of the validation method 300 includes receiving 310 a stored segment of the media bitstream; validating 314 a signature unit using the minor digital signature m; and validating 316a the received associated data units with respect to the fingerprints in the validated signature unit. Those signature units which do not include a minor signature m are validated in the conventional manner, using the major signature M. The first signature unit $S_1$, which contains a minor and a major signature unit but is not associated with any pruned instance of the repeating data unit O, can be validated using the major digital signature M. The second device 140 can be configured to initially attempt to validate each signature unit using the minor signature m; if this fails or the minor signature m is absent, it attempts to validate the signature unit using the major signature M; if both attempts are unsuccessful, the signature unit is rejected. Alternatively, the second device 140 is configured to initially attempt to validate each signature unit using the major signature M; if this fails, it checks whether a minor signature m exists and, if so, attempts to validate the signature unit using the minor signature m; if both attempts are unsuccessful, the signature unit is rejected.

Embodiment 2B.1

Figure 9:
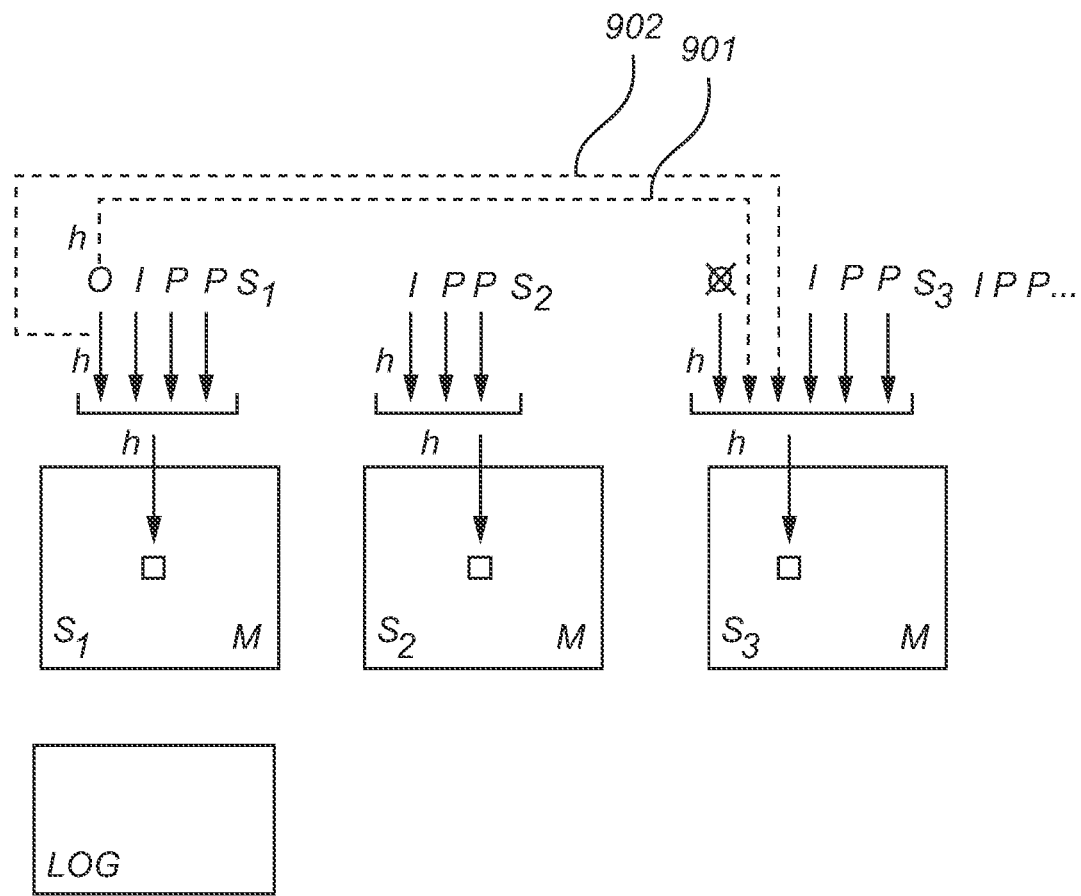
FIG. 9 illustrates a sequence of video frames including signature units $S_1$, $S_2$, $S_3$, the respective contents of which are shown in the lower part of the Figure, and repeating frames O at arbitrary positions, to which is an Embodiment 2B.1 of the disclosure is applicable, wherein a data structure LOG is added at storing and consulted at validation.

With reference to FIG. 9, a media bitstream format is considered where the repeating data unit O occupies variable positions. It is seen in FIG. 9 that the signature units $S_1$, $S_2$, $S_3$ contain fingerprints of fingerprints, i.e., obtained by applying the hash function h in a multi-level fashion. For example, the fingerprint in the first signature unit $S_1$ can be h({h(O), h(I), h(P), h(P)}), where {•} denotes concatenation. Alternatively, a cascading application of the hash function is possible, as was described above with reference to FIG. 6. For purposes of Embodiment 2B.1, it is sufficient for the signature units $S_1$, $S_2$, $S_3$ to contain only the major signature M.

Embodiment 2B.1 of the storing method 200 includes receiving 210 a segment of the media bitstream; identifying 212 N≥2 instances of a repeating data unit O in the received segment; pruning 214 up to N−1 of the identified instances of the repeating data unit; storing 216 the received segment after pruning; and storing 218 a pruning log LOG indicating the positions in the bitstream of the pruned instances of the repeating data unit O. It is understood that the signature units $S_1$, $S_2$, $S_3$ are stored intact, i.e., in the same condition as they were received 210. It is furthermore understood that the pruning log will occupy relatively less space than the pruned instances of the repeating data unit O.

Embodiment 2B.1 of the validation method 300 includes receiving 310 a stored segment of the media bitstream; receiving 312 a pruning log for the stored segment, the pruning log indicating the positions in the bitstream of pruned instances of a repeating data unit O; validating 314 a signature unit using the digital signature; and validating 316b the received associated data units with respect to the signature unit, while ignoring fingerprints of absent data units indicated by the pruning log; computing 318 a fingerprint of the received data units associated with the signature unit; computing 320a a fingerprint of an instance, not associated with the signature unit, of the repeating data unit and reinstating said computed fingerprint (as suggested by the lower dashed line 901) in accordance with the pruning log; computing 322 a fingerprint of the computed fingerprints; and validating 324b the computed fingerprint of fingerprints with respect to the fingerprint of fingerprints in the signature unit. Alternatively, as explained with reference to FIG. 6 above, a fingerprint of a pruned instance of the repeating data unit O can be retrieved from a signature unit associated with a not-pruned instance of the repeating data unit O, as illustrated by the upper dashed line 902.

Embodiment 2B.2

Figure 10:
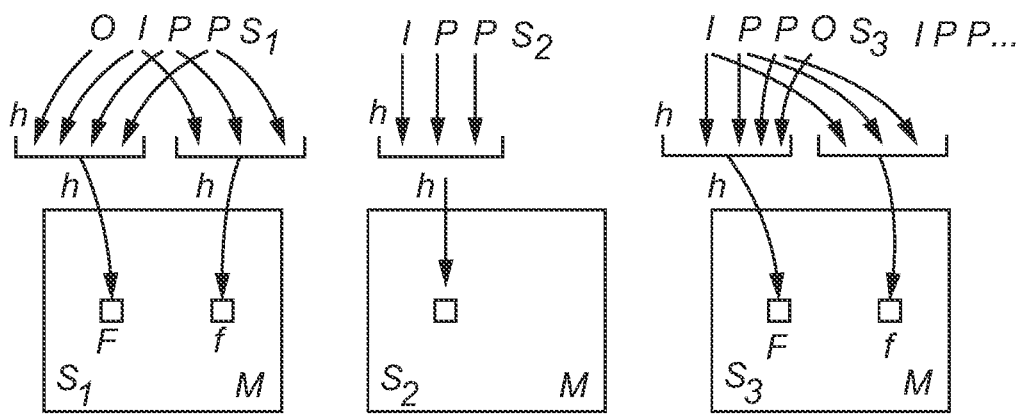
FIG. 10 illustrates a sequence of video frames including signature units $S_1$, $S_2$, $S_3$, the respective contents of which are shown in the lower part of the Figure, and repeating frames O at arbitrary positions, to which is an Embodiment 2B.2 of the disclosure is applicable for storing and validation.

With reference to FIG. 10, a media bitstream format is considered where the repeating data unit O occupies variable positions. It is seen that the signature units $S_1$, $S_2$, $S_3$ contain fingerprints of fingerprints, i.e., obtained by applying the hash function h in a multi-level fashion. For example, the fingerprint in the first signature unit $S_1$ can be h({h(O), h(I), h(P), h(P)}), where {•} denotes concatenation. Alternatively, a cascading application of the hash function is possible, as was described above with reference to FIG. 6. For purposes of Embodiment 2B.2, it is sufficient for the signature units $S_1$, $S_2$, $S_3$ to contain only the major signature M. It is also seen in FIG. 10 that those signature units $S_1$, $S_3$ which are associated with at least one instance of the repeating data unit O contain not only a (major) fingerprint of fingerprints of all associated data units, denoted F, but also a minor fingerprint of fingerprints, denoted f, which is independent of the fingerprints of the associated prunable instances of the repeating data unit O. The (major) signature M has been generated based on both F and f, and can thus be used for simultaneous validation of F and f.

Embodiment 2B.2 of the storing method 200 includes receiving 210 a segment of the media bitstream; identifying 212 N≥2 instances of a repeating data unit (O) in the received segment; pruning 214 up to N−1 of the identified instances of the repeating data unit; and storing 216 the received segment after pruning.

Embodiment 2B.2 of the validation method 300 includes receiving 310 a stored segment of the media bitstream; validating 314 a signature unit using the digital signature; computing 318 fingerprints of the received associated data units; computing 322 a fingerprint of the computed fingerprints units; and validating 324a the computed fingerprint of fingerprints with respect to the minor fingerprint of fingerprints, f.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method of validating a segment of a signed media bitstream composed of data units and signature units associated with one or more nearby data units, comprising:
  by a computing device:
  wherein at least two of the signature units include:
    fingerprints of all associated data units, and
    a digital signature of an at least one fingerprint,
  and wherein the signed media bitstream is in accordance with a format where positions of a repeating data unit are fixed,
  the method further comprising:
    receiving a stored segment of the signed media bitstream;

validating the at least two signature units using their respective digital signatures;
locating an instance of the repeating data unit associated with a first one of the at least two signature units;
validating received data units associated with the first one of the at least two signature units with respect to the fingerprints therein; and
validating received data units associated with a second one of the at least two signature units with respect to the fingerprints therein, while ignoring any fingerprint coinciding with the fingerprint of the located instance of the repeating data unit.

2. A method of validating a segment of a signed media bitstream composed of data units and signature units associated with one or more nearby data units, comprising:
by a computing device:
wherein at least one of the signature units includes:
a fingerprint of fingerprints of all associated data units, and
a digital signature of the fingerprint of fingerprints and of a minor fingerprint of fingerprints, wherein the minor fingerprint of fingerprints is independent of fingerprints of prunable ones of the associated data units,
and wherein the signed media bitstream is in accordance with a format where positions of a repeating data unit are fixed,
the method further comprising:
receiving a stored segment of the signed media bitstream;
validating the at least one signature unit using the digital signature;
computing fingerprints of the received associated data units;
computing a fingerprint of an instance, not associated with the at least one signature unit, of the repeating data unit and reinstating this repeating data unit in accordance with said fixed positions;
computing a fingerprint of the computed fingerprints; and
validating the computed fingerprint of fingerprints with respect to the fingerprint of fingerprints in the signature unit.

\* \* \* \* \*